Aug. 1, 1933.  C. A. PERKINS  1,920,883
ENGINE COOLING SYSTEM
Filed July 7, 1932
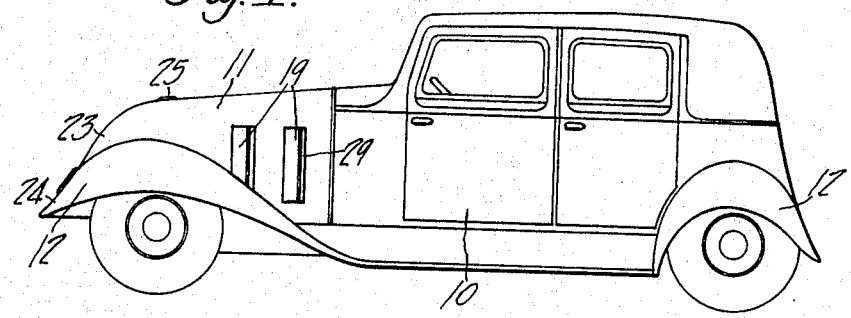
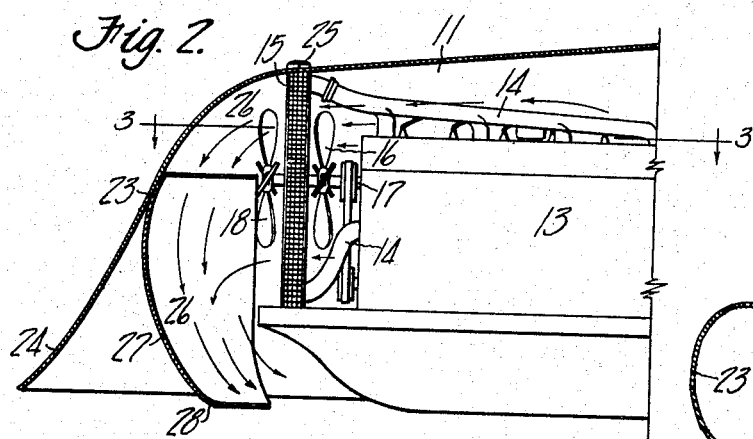
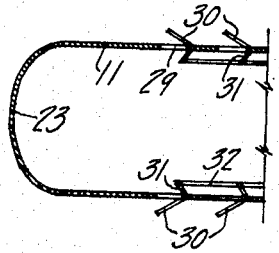
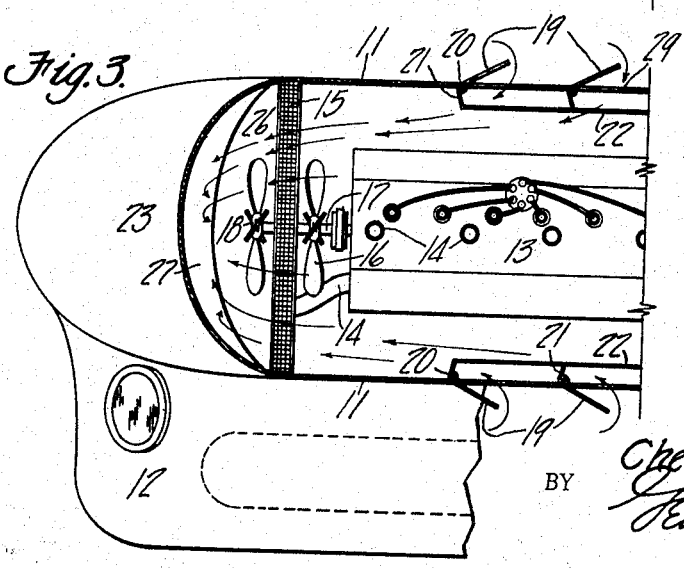
INVENTOR.
Chester A. Perkins.
BY George J. Otsch
ATTORNEY.

Patented Aug. 1, 1933

1,920,883

UNITED STATES PATENT OFFICE 1,920,883

ENGINE COOLING SYSTEM

Chester A. Perkins, South Bend, Ind.

Application July 7, 1932. Serial No. 621,233

11 Claims. (Cl. 123—174)

The device relates to engine cooling systems, and particularly to automobile cooling systems, and has for its principal object the provision of an effective cooling system entirely enclosed within the hood of the automobile whereby the hood may be effectively streamlined and enclosed at its front to minimize the wind resistance of the automobile.

A further object is to provide a device of this character in which the flow of air to and through the radiator is directed from the back to the front thereof.

A further object is to provide a device of this character including a hood provided with air directing means designed to provide an aspirating effect in the air stream and facilitate and increase the movement of the air through the system.

A further object is to provide a device of this character for an engine comprising a radiator and a fan positioned between the radiator and the engine and operable to draw and direct air forwardly to and through the radiator.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side view of an automobile provided with my improved engine cooling system.

Figure 2 is a fragmentary vertical longitudinal sectional view of the front portion of the automobile.

Figure 3 is a fragmentary horizontal sectional view taken on line 3—3 of Figure 2.

Figure 4 is a fragmentary horizontal sectional view of a modified form of the device, taken on line 3—3 of Figure 2.

Referring to the drawing, which illustrates the preferred embodiment of the invention, the numeral 10 designates an automobile body having a hood 11 and fenders 12. A conventional automobile engine 13 is housed within the hood 11, and has connection through intake and outlet conduits 14 with a radiator 15. A fan 16 is mounted on a shaft 17 driven by the engine and is positioned between the engine and the radiator. The shaft 17, if desirable or advisable under certain conditions, may extend forwardly through the radiator 15 to carry a second fan 18 positioned in front of the radiator. Both fans 16 and 18 draw and direct the air to and through the radiator 15 from the rear to the front thereof. A plurality of louver plates 19 are pivoted at 20 to the sides of the hood 11 at openings 29 therein and adjacent the front thereof, and these plates carry pivot arms 21 having connection with suitable operating rods 22 which may be manually operated or thermostatically controlled.

The hood 11 is preferably designed in streamlined shape to minimize the wind resistance thereof, and for this reason is preferably forwardly downwardly inclined and is provided with a rounded, forwardly and downwardly curved front portion 23 which terminates in a slight reverse curve 24 at its lower end. The front portion 23 of the hood is continuous and unbroken whereby it cleaves the air stream to provide the minimum air resistance to the movement of the automobile. The radiator 15 is mounted within the hood 11, and is provided with an intake conduit which projects through the hood at 25 to permit ready accessibility of the radiator for filling purposes. A passage 26 is provided between the radiator and the front of the hood, which may either communicate with the atmosphere as illustrated, or may have connection with a suitable conduit (not shown) extending rearwardly and terminating at the rear of the automobile whereby a great suction would be created in the system. In the passage 26 is positioned an air directing plate 27 which is welded or otherwise secured at its upper end to the front portion of the hood and which extends downwardly in curved formation and terminates in a rearwardly curved lip portion 28 which projects below the bottom of the hood.

The fenders 12 are preferably streamlined in complementary relation to the hood and the rear of body 10, and may be shaped with high crowns within which the wheels extend as illustrated in Figure 1, this shape of the fender reducing the air resistance to the wheels and the under side of the fenders. This shape of the fenders permits the headlights to be mounted within the fenders with their lens extending substantially flush with the fender and thus eliminating the air resistance of conventional headlights.

The operation of the device is as follows: The louver plates 19 are opened the necessary distance to permit the passage of sufficient air through the openings in the sides of the hood, and the operation of the fans 16, 18 during the operation of the engine draws air through said openings and forwardly in the hood to and through the radiator 15. It will be understood however, that two fans are shown merely by way of ilustration, and only one fan may be used and positioned either between the engine and the radiator to direct air to the radiator, or forwardly thereof to draw air to the radiator, as may be desirable. After passing through the radiator the air stream is directed through the passage 26 and is downwardly and rearwardly directed in the passage by the curved plate 27. The lip 28 formed at the lower end of plate 27 is shaped and arranged in a manner whereby the flow of air beneath the hood and past the lip creates a suction or aspirating action which draws the air from the passage 26, which aspirating action supplements the action of the fan or fans in circulating the air through the cooling system.

Aside from its effective action as a cooling system, one of the principal advantages obtained by the use of this system is by way of facilitating the use of hood designs not heretofore possible with automobiles. The current tendency in automobile design is to stream-line the parts as much as possible to reduce air pressure and resistance created by the movement of the car. Heretofore, it has been necessary to employ relatively large and exposed radiators for cooling purposes which, owing to their upright transverse position, presented much resistance to the air, the retarding effect of which increased proportionately as the speed of the car increased, and which consequently proportionately increased the propulsion power necessary to drive the car and the amount of fuel required. This fact has been commonly recognized, and present developments in the motor car field are directed to shaping the radiator or to providing shields which tend to cleave the air and thereby reduce the flat plate air resistance of the front of the car. In such instances it will be readily appreciated, however, that all attempts to shape radiators or to provide shields which will cleave the air reduce the effectiveness of the cooling system, since the cleavage of the air obtained results in diversion thereof away from the radiator. In contradistinction to the above described constructions, my improved system provides both the advantages of reducing the air resistance to the movement of a car to a minimum, and at the same time provides an adequate cooling action without the flat plate resistance and exposed positioning of the radiator. The louvers may be opened to permit the necessary flow of air through the hood openings, and the air is effectively drawn through said hood openings by the fans and also by the aspirating effect created by the lip 28, and the productive effect of each is increased proportionately with the requirements for air circulation due to increased engine speed in the same manner in which the productive effect is increased upon increased motor car speed in the use of exposed radiators.

It will also be seen that the hood, by forming a closure for the front as well as the sides and top of the engine and radiator, effectively eliminates all possibility of rain reaching and short-circuiting the electrical parts and connections of the engine. Another advantage of the construction resides in shielding the radiator whereby bugs and other objects struck by the car will not be imbedded in the radiator to stop up the air passages thereof to prevent the passage of air therethrough as occurs in conventional motor car constructions in which the radiator is fully or partially exposed.

A modified form of the hood 11 is illustrated in Figure 4. In this modified form, louver plates 30 are pivoted to the sides of the hood rearwardly of the air intake openings 29 in the hood and extend angularly forwardly of their pivotal connection with the hood. Forwardly, angularly inwardly directed plates 31 are carried by plates 30, and suitable operating rods 32 are carried by plates 31 at their inner ends by means of which the position of louver plates 30 may be controlled and adjusted. It will be seen that a modified air intake controlling device is thus provided by which the air is directed into the openings 29 of the hood. The plates 31 are suitably formed to change the direction of the air as it enters the hood, whereby it is directed forwardly in the hood. This plate 31 also serves as a filter for the air stream, since bugs and other articles in the air stream are thrown against said plate as they enter the hood and then fall, rather than being carried to the radiator. It will also be seen that by this modified form, the air is directed into the hood to facilitate the movement of the air to the radiator and to supplement the action of the fan in directing the air stream forwardly in the hood, which may be desirable under certain conditions.

The invention having been set forth, what is claimed as new and useful is:

1. In an engine cooling system, a water-jacketed engine, a radiator having connection with said water jacket, a hood enclosing said engine and radiator and having a closed front spaced from said radiator, said hood having an air intake opening in one side thereof and an air outlet opening forwardly of said radiator, whereby air enters said hood rearwardly of said radiator thence moves forwardly to and through said radiator and thence is discharged through said outlet opening.

2. In an engine cooling system, a water-jacketed engine, a radiator having connection with said water jacket, a fan driven by said engine, a hood enclosing said engine, radiator and fan and having a closed front spaced from said radiator, said hood having an air intake opening in one side thereof and an air outlet opening forwardly of said radiator, adjustable means controlling the intake of air through said intake opening, the air from said intake opening being directed forwardly to and through said radiator by said fan and thence discharging through said outlet opening.

3. In an engine cooling system, a water-jacketed engine, a radiator having connection with said water jacket, a fan driven by said engine and positioned between said engine and radiator, a hood enclosing said engine, radiator and fan and having a closed front spaced from said radiator, said hood having an air intake opening in one side thereof and a discharge opening at its lower side disposed forwardly of said radiator, whereby air enters said hood through said intake opening, thence passes forwardly through said radiator, and thence moves downwardly in said hood to said discharge opening.

4. In an engine cooling system, a water-jacketed engine, a radiator having connection with said water jacket, and a streamlined hood enclosing said engine and radiator and having a front portion spaced from said radiator to form a discharge passage communicating with the atmosphere, said hood having an air intake opening in one of its sides from which air entering said hood passes forwardly through said radiator to said discharge passage.

5. In an engine cooling system, a water-jacketed engine, a radiator having connection with said water jacket, a hood enclosing said engine and radiator and having a front portion spaced from said radiator to form a discharge passage communicating with the atmosphere, said hood having an air intake opening in one of its sides positioned rearwardly of said radiator, and means driven by said engine for creating a flow of air forwardly from said intake opening through said radiator to said discharge passage.

6. In an engine cooling system, a water-jacketed engine, a radiator having connection with said water jacket, a streamlined hood enclosing said engine and radiator and having a front portion spaced from said radiator to form a discharge passage communicating with the atmosphere, said hood having an air intake opening in one of its sides from which air entering the hood passes forwardly through said radiator to said discharge passage, and means carried by said hood forwardly of said radiator for directing the air from said radiator through said discharge passage.

7. In an engine cooling system, a water-jacketed engine, a radiator having connection with said water jacket, a streamlined hood enclosing said engine and radiator and having an air intake opening rearwardly of said radiator, said hood having a closed front spaced from said radiator, and a rearwardly curved downwardly directed plate carried by the front of and within said hood to form a discharge passage, the air entering said air intake opening passing forwardly through said radiator to said plate by which it is directed through said discharge passage.

8. In an engine cooling system for automotive vehicles, a water-jacketed engine, a radiator having connection with said water jacket, a streamlined hood enclosing said engine and radiator and having an air intake opening rearwardly of said radiator, said hood having a closed front spaced from said radiator to form a discharge passage, and a rearwardly curved, downwardly directed plate disposed in said discharge passage and carried by said hood, said plate directing through the discharge passage the air which has passed through said radiator from said intake opening, and a lip carried by said plate and projecting below said hood, said lip being shaped to provide an aspirating effect facilitating the flow of air through the system when the vehicle is in motion.

9. In an engine cooling system for automotive vehicles, a water-jacketed engine, a radiator having connection with said water jacket, a hood enclosing said engine and radiator and having an air intake opening rearwardly of said radiator, said hood having a closed front spaced from said radiator to form a discharge passage, the air from said intake opening passing forwardly through said radiator to said discharge passage, and means carried by said hood and positioned in said discharge passage for creating an aspirating effect facilitating the flow of air through the system when the vehicle is in motion.

10. In an engine cooling system for automotive vehicles, a water-jacketed engine, a radiator having connection with said water jacket, a hood enclosing said engine and radiator and having an air intake opening rearwardly of said radiator, said hood having a closed front spaced from said radiator to form a discharge passage, means creating an air flow forwardly and through said radiator to said discharge passage, and means associated with said hood in said discharge passage for creating an aspirating effect facilitating the flow of air through the system when the vehicle is in motion.

11. In an engine cooling system for automotive vehicles, a water-jacketed engine, a radiator having connection with said water jacket, a hood enclosing said engine and radiator and having an air intake rearwardly of said radiator, said hood being spaced from said radiator at its forward end to form a discharge passage, and means creating an air flow forwardly through said hood and through said radiator to said discharge passage.

CHESTER A. PERKINS.